United States Patent
Leppänen et al.

(10) Patent No.: US 11,904,495 B2
(45) Date of Patent: Feb. 20, 2024

(54) LOG HANDLING DEVICE AND METHOD FOR LOG HANDLING

(71) Applicant: VEISTO OY, Mäntyharju (FI)

(72) Inventors: Juha Leppänen, Mäntyharju (FI); Marko Marttila, Mäntyharju (FI)

(73) Assignee: VEISTO OY, Mäntyharju (FI)

( * ) Notice: Subject to any disclaimer, the term of this patent is extended or adjusted under 35 U.S.C. 154(b) by 143 days.

(21) Appl. No.: 17/603,231

(22) PCT Filed: Mar. 2, 2020

(86) PCT No.: PCT/FI2020/050130
§ 371 (c)(1),
(2) Date: Oct. 12, 2021

(87) PCT Pub. No.: WO2020/208293
PCT Pub. Date: Oct. 15, 2020

(65) Prior Publication Data
US 2022/0184844 A1    Jun. 16, 2022

(30) Foreign Application Priority Data
Apr. 12, 2019 (FI) .................................. 20195303

(51) Int. Cl.
*B27B 25/04* (2006.01)
*B27B 31/00* (2006.01)
*B27B 25/02* (2006.01)

(52) U.S. Cl.
CPC ............. *B27B 25/02* (2013.01); *B27B 25/04* (2013.01); *B27B 31/003* (2013.01)

(58) Field of Classification Search
CPC ......... B27B 25/02; B27B 25/04; B27B 29/08; B27B 29/085; B27B 31/00; B27B 31/003; B27B 31/04; B27L 1/00; B27L 1/08
See application file for complete search history.

(56) References Cited

U.S. PATENT DOCUMENTS 2,802,495 A    8/1957 Nicholson
5,294,066 A *  3/1994 Lacour ................ B65H 75/425
                                                    242/396.5
(Continued)

FOREIGN PATENT DOCUMENTS

CN    1413140 A    4/2003
CN    104070583 A  10/2014
(Continued)

OTHER PUBLICATIONS

International Search Report for PCT/FI2020/050130, Prepared by the Finnish Patent and Registration Office, dated May 27, 2020, 4 pages.

(Continued)

*Primary Examiner* — Adam J Eiseman
*Assistant Examiner* — Jared O Brown
(74) *Attorney, Agent, or Firm* — Brooks Kushman P. C.; John E. Nemazi

(57) ABSTRACT

A log handling device, having a rotatable rotor provided with a log handler, and a feeder attached to the rotor for conducting an operating medium to the log handler. The feeder is arranged to wind around the rotor when the rotor is rotated in a first direction, and which feeder is arranged to unwind from around the rotor when the rotor is rotated in a second direction. The log handling device includes a rotatable second rotor to which the feeder is attached, and an operating device for rotating the second rotor synchronously with the rotor, such that the feeder is arranged to wind around the second rotor when the rotor is rotated in the second direction, and such that the feeder is arranged to unwind from around the second rotor when the rotor is rotated in the first direction.

8 Claims, 1 Drawing Sheet

(56) References Cited

Figure 1:
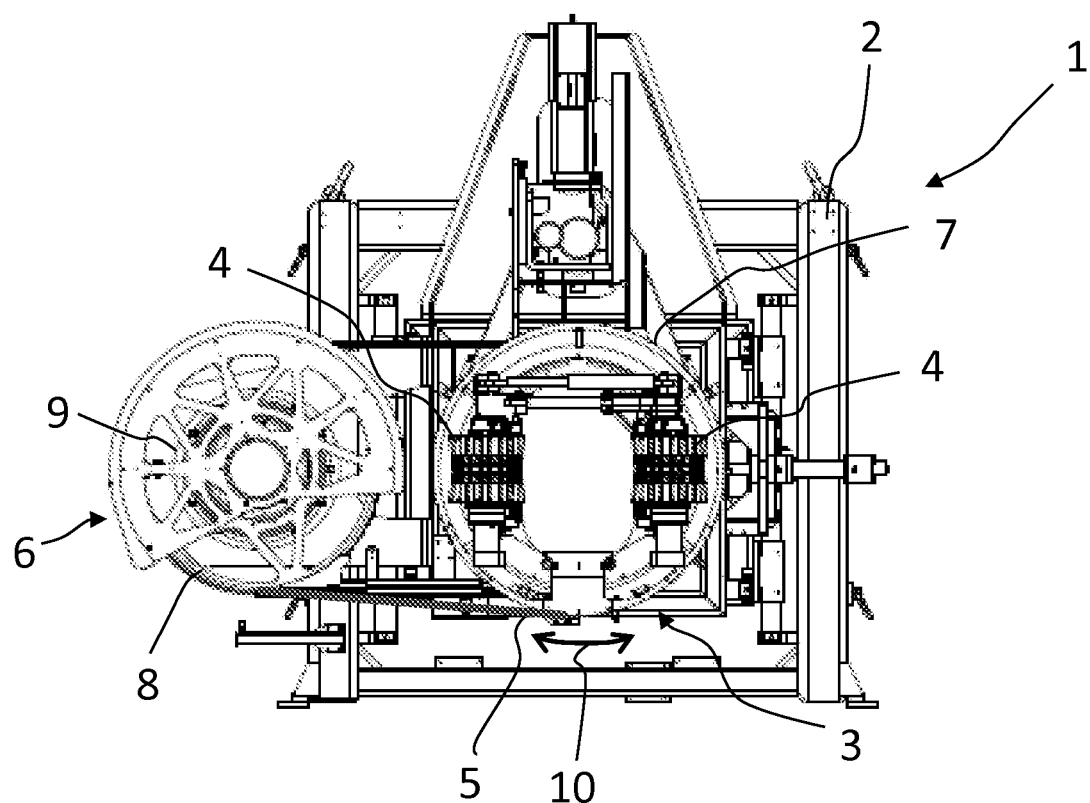

U.S. PATENT DOCUMENTS 5,622,213 A * 4/1997 McKelvie ............... B27B 31/04
198/782
2009/0133781 A1 5/2009 Issukka

FOREIGN PATENT DOCUMENTS

| EP | 2063162 A1 | 5/2009 |
| GB | 790256 A | 2/1958 |
| WO | 2001037375 A2 | 5/2001 |
| WO | 2001049469 A1 | 7/2001 |

OTHER PUBLICATIONS

Extended European Search Report for Application No. EP20788152, dated Dec. 14, 2022, 5 pages.

* cited by examiner

LOG HANDLING DEVICE AND METHOD FOR LOG HANDLING

CROSS-REFERENCE TO RELATED APPLICATION

This application is the U.S. national phase of PCT Application No. PCT/FI2020/050130 filed on Mar. 2, 2020, which claims priority to FI Patent Application No. 20195303 filed on Apr. 12, 2019, the disclosures of which are incorporated in their entirety by reference herein.

The invention relates to a log handling device comprising a rotatable rotor provided with log handling means, and a feeding means attached to the rotor for feeding an operating medium to the log handling means. The invention also relates to a method for log handling.

At sawmills, log handling devices are used, comprising a rotatable rotor to which a hydraulic fluid, electricity and/or compressed air is fed to operate log handling means and/or electrical devices disposed in the rotor. One log handling device of this type is a log rotator by which the logs moving along a sawing line are rotated to a desired angle for example for cant chipping. A similar device may be used at sawmills at least in a cant turner between a head saw and a resaw. The log coming from the head saw with at least two of its sides having been cut is there turned by 90° about its longitudinal axis on its side face.

The log rotator comprises a back-and-forth rotatable rotor provided with feeding rolls between which the log is introduced and by which the log is moved forward during the rotation. The feeding rolls of the log rotator are hydraulically operated. In addition, the rotor may be provided with sensors requiring electricity, and/or pneumatic devices. An operating medium, such as hydraulic fluid, electricity and/or compressed air, must be feedable to the log rotator's rotor which is rotated back and forth about its centre point by up to 180 degrees. The operating medium feed cannot be arranged in the centre part of the rotor, as the log is being moved there. Normally, the feeds are conveyed to the rim of the rotor, and from the rim they are passed further to the log handling means and other devices. The rotor usually makes its rotary motion quickly, typically in half of a second, causing the hoses and cables to swing and move in an uncontrollable manner, which may lead to their wearing and breaking.

Moving of the hoses and cables may be reduced by means of tightening rolls reducing the movement of the hoses and cables through loading, and by means of cable chains inside which the hoses and cables are passed. However, these solutions do not reduce the uncontrolled movement of the hoses and cables to a sufficient degree, and they also exert a load on the hoses and cables. Document EP2063162 A (corresponds to FI 120029) describes a log rotator and one known configuration for feeding an operating medium to the rotor of the log rotator.

The object of this invention is to provide a log handling device and method by which the problems described above may be alleviated.

The object according to the invention is achieved by a log handling device according to claim 1 and a method according to claim 7.

The log handling device according to the invention comprises a rotatable rotor provided with log handling means, and a feeding means attached to the rotor for conducting an operating medium to the log handling means. The feeding means is arranged to wind around the rotor when the rotor is rotated in a first direction, and the feeding means is arranged to unwind from around the rotor when the rotor is rotated in a second direction. Further, the log handling device comprises a rotatable second rotor to which the feeding means is attached, and an operating device for rotating the second rotor synchronously with the rotor, such that the feeding means is arranged to wind around the second rotor when the rotor is rotated in the second direction, and that the feeding means is arranged to unwind from around the second rotor when the rotor is rotated in the first direction.

The invention provides considerable advantages. In the log handling device according to the invention, the feeding means unwinding from the rotor is wound around the second rotor. Correspondingly, when the feeding means winds around the rotor, the feeding means is unwound from around the second rotor. This way, it is possible to prevent excessive loosening and tightening of the feeding means when the rotor is rotated, which reduces the uncontrolled movement of the feeding means and mechanical load exerted on the feeding means, thereby increasing the useful life of the feeding means.

Figure 2:
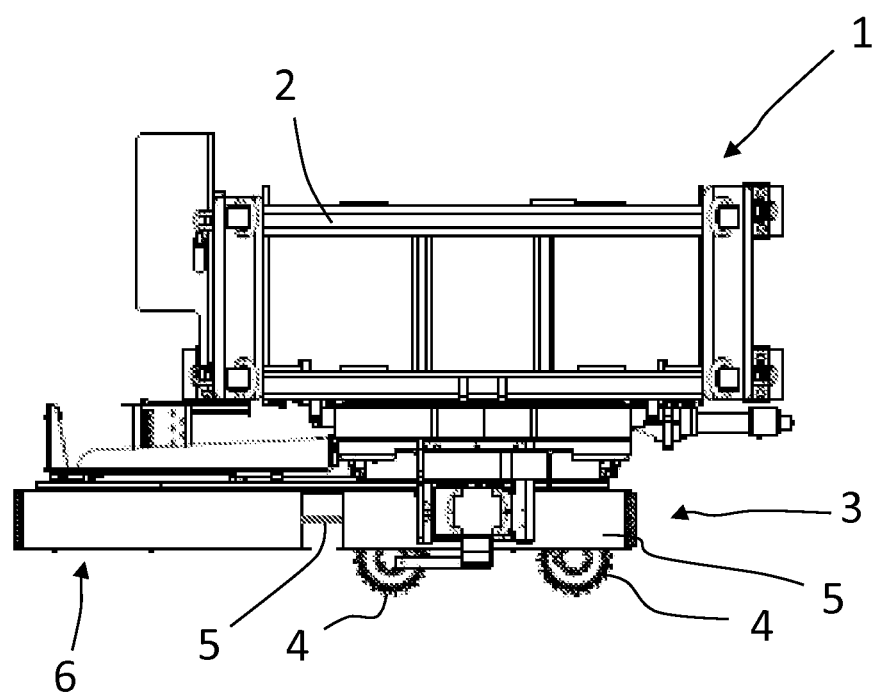

The invention will now be described in detail by way of examples with reference to the accompanying drawings, in which FIG. 1 is a front view of a log handling device according to one embodiment of the invention, and FIG. 2 is a top view of the log handling device of FIG. 1.

The drawings illustrate a log handling device 1 used at sawmills for handling logs. The log handling device 1 is, for instance, a log rotator by which the logs are rotated about their longitudinal axis to a desired position and/or moved forward in the longitudinal direction along the sawing line. For example, a log coming to a chipping canter is rotated by the log rotator to a desired position for chipping. A similar device may be used at sawmills at least in a cant turner, between a head saw and a resaw. The log coming from the head saw with at least two of its sides having been cut is there turned by 90° about its longitudinal axis on its side face.

The log handling device 1 comprises a frame 2 to which a rotatable rotor 3 is mounted. The rotor 3 is rotatable backwards and forwards. The rotation direction of the rotor 3 is indicated by an arrow 10 in the drawings. The rotation angle of the rotor 3 is limited. Typically, the rotor 3 is rotatable by up to 180 degrees about its centre point. Further, the log handling device 1 comprises a motor for rotating the rotor 3. The log being handled is moved in the longitudinal direction through the rotor 3.

The rotor 3 comprises log handling means 4 which rotate with the rotor 3. The log handling means 4 may be rotatable feeding rolls arranged against opposite sides of the log. The feeding rolls are rotated by means of hydraulic motors mounted to the rotor 3. The rotor 3 comprises an actuator for positioning the feeding rolls, i.e. for moving them in the radial direction of the log. The actuator is typically a hydraulic cylinder, but alternatively also an electrical or pneumatic actuator may be used. In addition, the rotor 3 may comprise electrical devices, such as sensors, and/or pneumatic devices.

The log handling device 1 comprises a feeding means 5 for conducting an operating medium, such as hydraulic fluid, electricity and/or compressed air, to the handling means 4 and/or other devices of the rotor 3 and/or for drawing it out from the handling means 4. The feeding means 5 may comprise one or more hydraulic hoses and/or electrical cables and/or pneumatic hoses. The feeding means 5 is attached to the rotor 3. The rotor 3 comprises a ring-shaped frame part 7, to the outer rim of which the feeding means 5 is attached. The feeding means 5 is fixedly attached to the rotor 3, typically to the outer rim of the frame part 7. From the frame part 7, the feeding means 5 is further passed to the device using the operating medium, such as the log handling means 4. For this purpose, the frame part 7 may be provided with an opening through which the feeding means 5 is taken inside the frame part 7 and further to the device using the operating medium.

Further, the log handling device 1 comprises a second rotatable rotor 6 and an operating device for rotating the second rotor 6 synchronously with the rotor 3. The operating device is, for instance, a separate servo drive or a chain or belt drive rotating the rotor 3 and the second rotor 6. In the latter case, the chain or belt is arranged to pass via the rim of each of the rotors. The second rotor 6 is mounted to the frame 2 of the handling device 1. The rotor 3 and the second rotor 6 are arranged side by side. The rotation axes of the rotor 3 and the second rotor 6 are parallel. The rotation axes of the rotor 3 and the second rotor 6 lie at a constant distance from each other during the use of the handling device 1. The feeding means 5 is attached to the second rotor 6. The second rotor 6 comprises a rim 8 to which the feeding means 5 is attached. The rotor 3 and the second rotor 6 are rotated such that the rim speeds of the frame part 7 of the rotor 3 and the rim 8 of the second rotor 6 are equally high. The rim 8 is circular. The feeding means 5 is fixedly attached to the second rotor 6, typically to the rim 8 of the second rotor.

The feeding means 5 is arranged to wind around the rotor 3 when the rotor 3 is rotated in a first direction. Correspondingly, the feeding means 5 is arranged to unwind from around the rotor 3 when the rotor 3 is rotated in a second direction.

The second rotor 6 is rotated by the actuator synchronously with the rotor 3, such that the feeding means 5 is arranged to wind around the second rotor 6 when the rotor 3 is rotated in the second direction, and that the feeding means 5 is arranged to unwind from around the second rotor 6 when the rotor 3 is rotated in the first direction.

The second rotor 6 also comprises a second rim 9 having a smaller diameter than the rim 8. The feeding means 5 is passed from the rim 8 to the second rim 9 and attached to the second rim 9. The feeding means 5 is fixedly attached to the second rim 9. Typically, the diameter of the second rim 9 is at most half of the diameter of the rim 8. The feeding means 5 is passed further from the second rim 9 to an operating medium source, for example hydraulic fluid source and/or electricity input and/or compressed air source. The part of the feeding means 5 between the second rotor 6 and the operating medium source is not illustrated in the figures. Instead of the second rim 9, it is possible to use a rotary union arranged on the rotation axis of the second rotor 6 for coupling the feeding means 5 thereto. The second rim 9 is circular. As the diameter of the second rim 9 is smaller than that of the rim 8, introduction of the feeding means 5 from the rim 8 to the second rim 9 reduces its uncontrolled movement when the second rotor 6 is rotated. The log handling device 1 may comprise a pinch roll or a cable chain to which the feeding means 5 exiting the second rotor 6 is passed. In this case, the feeding means 5 is passed from the second rim 9 to the pinch roller or the cable chain and further to the operating medium source. This way the uncontrolled movement of the feeding means 5 may further be reduced.

The feeding means 5 is passed from the handling means 4 to the outer rim of the frame part 7 of the rotor 3. The feeding means 5 is attached to the frame part 7. From the rotor 3, the feeding means 5 is passed to the rim 8 of the second rotor 6. The feeding means 5 is attached to the rim 8. From the rim 8, the feeding means 5 is further passed to the second rim 9. The feeding means 5 is attached to the second rim 9. From the second rim 9, the feeding means 5 is passed to the operating medium source.

The log handling device 1 according to the drawings operates in the following way. The operating medium is conducted from the operating medium source through the feeding means 5 to the rotor 3, to the log handling means 4 and/or other devices of the rotor 3. The log is brought along the sawing line to the log handling device 1. The log is moved through the rotor 3 of the handling device 1 in the longitudinal direction. At the same time, the log is handled by the handling means 4. In case the handling device 1 is a log rotator, the log is rotated to a desired position by moving the feeding rolls against opposite sides of the log and by rotating the rotor 3. At the same time, the feeding rolls are rotated about their centre axes in order to move the log forward. Finally, the log is removed from the handling device 1.

When the rotor 3 is rotated in the first direction, the feeding means 5 winds around the rotor 3. The feeding means 5 winds around the frame part 7 of the rotor 3. When the rotor 3 is rotated in the second direction, the feeding means 5 unwinds from around the rotor 3. The first direction is opposite to the second direction. Loosening of the feeding means 5 unwinding from around the rotor 3 and tightening of the feeding means 5 winding around the rotor 3 are prevented by rotating the second rotor 6. The second rotor 6 is rotated such that the feeding means 5 winds around the second rotor 6 when the rotor 3 is rotated in the second direction. For this purpose, the second rotor 6 is rotated in the second direction. Correspondingly, the second rotor 6 is rotated such that the feeding means 5 unwinds from around the second rotor 8 when the rotor 3 is rotated in the first direction. For this purpose, the second rotor is rotated in the first direction. The feeding means 5 winds around the rim 8 of the second rotor 6 and unwinds from around the rim 8. The second rotor 6 is rotated by the operating device.

The second rotor 6 is rotated synchronously with the rotor 3. This way, the feeding means 5 winds to the second rotor 6 and unwinds from the rotor 3 at the same speed. Correspondingly, the feeding means 5 winds to the rotor 3 and unwinds from the second rotor 6 at the same speed. The rotor 3 and the second rotor 6 are rotated simultaneously. The rim speeds of the frame part 7 of the rotor and of the rim 8 of the second rotor are equally high. The rim 8 and the second rim 9 of the second rotor are rotated at the same angular speed and about a common rotation axis.

The log handling device 1 may comprise measuring devices, such as sensors, by which the rotary motion of the rotor 3 and the second rotor 6 and/or the position of the log is measured. The log handling device 1 may comprise an adjustment unit by which the motor of the rotor 3 and the operating device for the second rotor 6 are controlled to adjust the rotation of the rotor 3 and the second rotor 6 for example on the basis of measurement data obtained from the measuring devices.

The invention claimed is:

1. A log handling device, comprising:
a rotatable rotor provided with log handling means, and
a feeding means attached to the rotor for conducting an operating medium to the log handling means,
the feeding means being arranged to wind around the rotor when the rotor is rotated in a first direction,
the feeding means being arranged to unwind from around the rotor when the rotor is rotated in a second direction, a rotatable second rotor to which the feeding means is attached, and an operating device for rotating the second rotor synchronously with the rotor, such that the feeding means is arranged to wind around the second rotor when the rotor is rotated in the second direction, and wherein the feeding means is arranged to unwind from around the second rotor when the rotor is rotated in the first direction;

wherein the second rotor comprises a rim to which the feeding means is attached and around which the feeding means is arranged to wind, wherein the second rotor comprises a second rim, the diameter of which is smaller than the diameter of the rim and which is arranged to rotate concentrically with the rim, and wherein the feeding means is passed from the rim to the second rim and is attached to the second rim.

2. The log handling device according to claim 1, wherein the rotor comprises a ring-shaped frame part to which the feeding means is attached and around which the feeding means is arranged to wind.

3. The log handling device according to claim 2, wherein the rotor and the second rotor are arranged to rotate synchronously, such that speeds of the ring-shaped frame part and a rim are the same.

4. The log handling device according to claim 1, wherein the second rotor comprises a rim to which the feeding means is attached and around which the feeding means is arranged to wind.

5. The log handling device according to claim 1, wherein the log handling device is a log rotator, wherein the log handling means comprise two feeding rolls mounted to the rotor for gripping the log.

6. A method for log handling by means of a log handling device comprising a rotatable rotor provided with log handling means, and a feeding means for conducting an operating medium to the log handling means, the method comprising:
bringing a log to the log handling device and handling it with the handling means,
rotating the rotor in a first direction, whereby the feeding means winds around the rotor, and rotating the rotor in a second direction, whereby the feeding means unwinds from around the rotor, and
removing the log from the log handling device,
wherein the log handling device comprises a second rotor which is rotated synchronously with the rotor, such that the feeding means winds around the second rotor when the rotor is rotated in the second direction, and wherein the feeding means unwinds from around the second rotor when the rotor is rotated in the first direction,
wherein the second rotor comprises a rim to which the feeding means is attached and around which the feeding means is wound,
wherein the second rotor comprises a second rim, the diameter of which is smaller than the diameter of the rim and which is rotated concentrically with the rim, and wherein the feeding means is passed from the rim to the second rim and is attached to the second rim.

7. The method according to claim 6, wherein the rotor comprises a ring-shaped frame part to which the feeding means is attached and around which the feeding means is wound.

8. The method according to claim 6, wherein the log handling device is a log rotator by which the log is rotated, and wherein the log handling means of the log rotator comprise two feeding rolls mounted to the rotor and arranged against opposite sides of the log.

* * * * *